US011259006B1

(12) United States Patent
Eash et al.

(10) Patent No.: US 11,259,006 B1
(45) Date of Patent: Feb. 22, 2022

(54) ENCODED DEPTH DATA FOR DISPLAY

(71) Applicant: Avegant Corp., Belmont, CA (US)

(72) Inventors: Aaron Matthew Eash, San Francisco, CA (US); Allan Thomas Evans, San Francisco, CA (US); Andrew John Gross, Redwood City, CA (US); D. Scott Dewald, Dallas, TX (US); Edward Chia Ning Tang, Menlo Park, CA (US); Forrest Foust, Sunnyvale, CA (US); Joseph Roger Battelle, Belmont, CA (US); Kevin William King, San Francisco, CA (US); Mark P. Palaima, Saratoga, CA (US); Warren Cornelius Welch, III, Foster City, CA (US)

(73) Assignee: Avegant Corp., San Mateo, GA (US)

( * ) Notice: Subject to any disclaimer, the term of this patent is extended or adjusted under 35 U.S.C. 154(b) by 0 days.

(21) Appl. No.: 16/242,826

(22) Filed: Jan. 8, 2019

(51) Int. Cl.
*H04N 13/178* (2018.01)
*H04N 13/344* (2018.01)
*H04N 13/161* (2018.01)
*H04N 13/128* (2018.01)

(52) U.S. Cl.
CPC ......... *H04N 13/178* (2018.05); *H04N 13/128* (2018.05); *H04N 13/161* (2018.05); *H04N 13/344* (2018.05)

(58) Field of Classification Search
CPC .......................... H04N 13/178; H04N 13/344
See application file for complete search history.

(56) References Cited

U.S. PATENT DOCUMENTS

| 7,712,664 | B2 | 5/2010 | Takahashi et al. | |
|---|---|---|---|---|
| 9,979,961 | B2 | 5/2018 | Takahashi et al. | |
| 2010/0309287 | A1 | 12/2010 | Rodriguez | |
| 2011/0081097 | A1* | 4/2011 | Chiaki | H04N 1/32144 382/274 |
| 2013/0050432 | A1* | 2/2013 | Perez | G06F 3/017 348/47 |
| 2013/0329008 | A1 | 12/2013 | Takahashi et al. | |
| 2014/0063185 | A1 | 3/2014 | Chen et al. | |
| 2014/0205015 | A1 | 7/2014 | Rusert et al. | |
| 2015/0262013 | A1 | 9/2015 | Yamashita et al. | |
| 2015/0277121 | A1* | 10/2015 | Fridental | H04N 13/322 348/54 |
| 2016/0373722 | A1* | 12/2016 | Mishra | G06T 1/0028 |
| 2019/0147235 | A1 | 5/2019 | Tang et al. | |
| 2019/0147570 | A1 | 5/2019 | Lin et al. | |
| 2019/0304139 | A1 | 10/2019 | Joshi et al. | |
| 2019/0373278 | A1 | 12/2019 | Castaneda et al. | |
| 2020/0045287 | A1 | 2/2020 | Varekamp et al. | |

\* cited by examiner

*Primary Examiner* — Girumsew Wendmagegn
(74) *Attorney, Agent, or Firm* — Nicholson De Vos Webster & Elliott LLP; Judith Szepesi

(57) ABSTRACT

A method of providing correlated depth data in video data, the method comprising identifying depth information encoded within pixel information of a frame of video data, extracting the depth information, and utilizing the depth information for displaying the video data to a user.

20 Claims, 9 Drawing Sheets

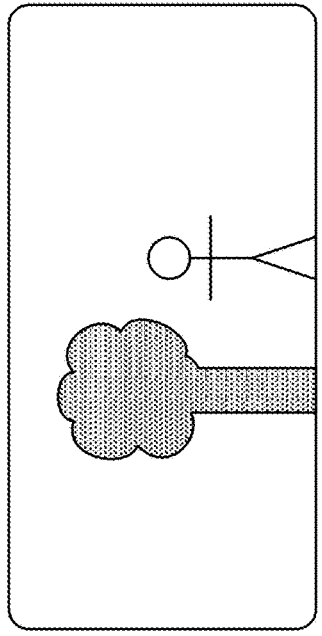
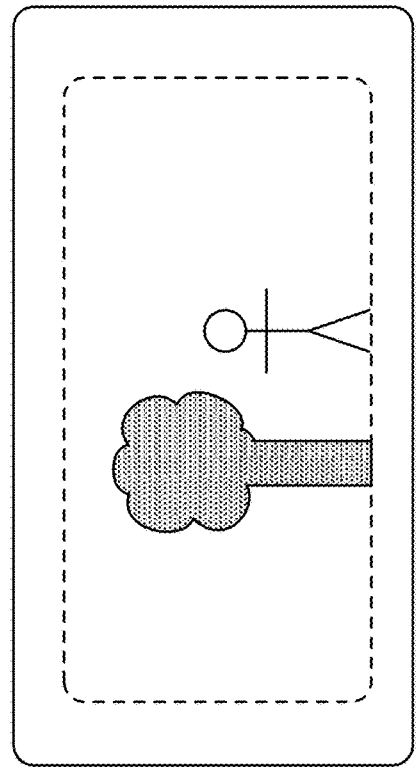
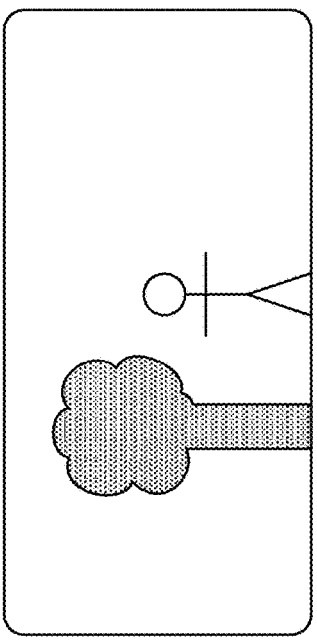
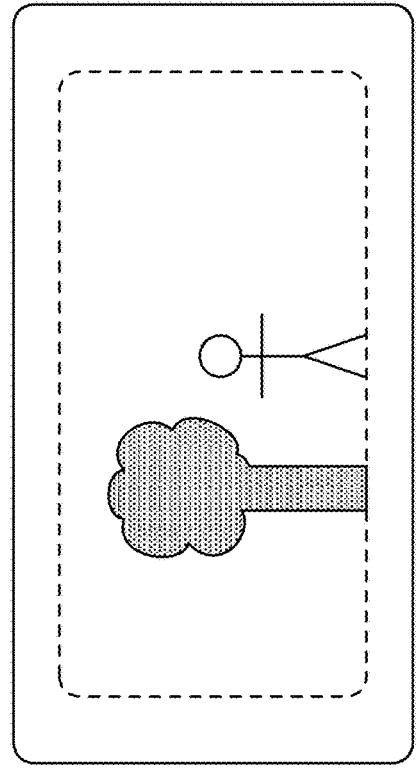
Fig. 1B
Fig. 1C

ENCODED DEPTH DATA FOR DISPLAY

FIELD

The present invention relates to depth displays, and more particularly to integrating depth data into video data.

BACKGROUND

As displays evolve, the next generation of displays include displaying data at one or more of a plurality of focal depths. By having images at a plurality of focal depths, the display more closely mimics the real-world experience of users. Additionally, by integrating depth data, the systems can be used to present improved three-dimensional video or images to a user.

In one prior art method, depth data is provided to the system through a separate depth system, which is then aligned with the video data.

BRIEF DESCRIPTION OF THE FIGURES

The present invention is illustrated by way of example, and not by way of limitation, in the figures of the accompanying drawings and in which like reference numerals refer to similar elements and in which:

FIG. 1B illustrates an example of the visible areas of the right and left eyes in a near eye display.

FIG. 1C illustrates an example of the actual display area for the right and left eyes.

DETAILED DESCRIPTION

The present invention relates to encoding depth information in a video frame. A video frame may be associated with a video or a still image displayed on a display. The depth information indicates the depth at which a frame, or a portion of a frame, should be displayed. In one embodiment, the depth information is encoded in the pixel information of the frame. Pixel information refers to data encoded in displayed or non-displayed pixels of the frame, rather as meta-data or other associated data. This enables the encoding of depth data in a self-aligning and video interface independent format, unlike metadata which is language and platform dependent. That is, the depth data may be accessible to any display system, rather than being formatted for a particular interface. The pixel information may include encoding the data into one or more pixels within the active display area, or the front or back porch, which are part of the frame but not visible to the user. The depth information, in one embodiment, may be provided using a plug-in application, without knowing the actual memory structures and protocols used in the display.

In one embodiment, the pixel information may be based on color(s), position, size, or a combination of these factors. In one embodiment, the pixel information may further encode additional cues other than depth. The additional cues may be, for example, areas to crop in the frame, image position, overscan correction, resolution variation, color depth/bit depth, or brightness. Other controls for the display may also be encoded within pixel information. In one embodiment, the additional cues may be used to synchronize the display with external data, or with another display. For example, the depth-aware display may be a steerable display. For another example, the depth-aware display may be used in combination with an area display, or screen. The embedded cues may enable synchronization between the displays. For another example, the depth-aware display may be an area display, with an associated steerable display.

Because the data is encoded in a way that does not require another data stream in addition to the video data, the encoding is video interface independent. In one embodiment, if the display cannot interpret the depth data, it can simply ignore it, without having a negative impact. Additionally, because the data is within the frame itself, it is self-aligning, that is there is no need to synchronize it separately since it is part of the appropriate frame.

Figure 1A:
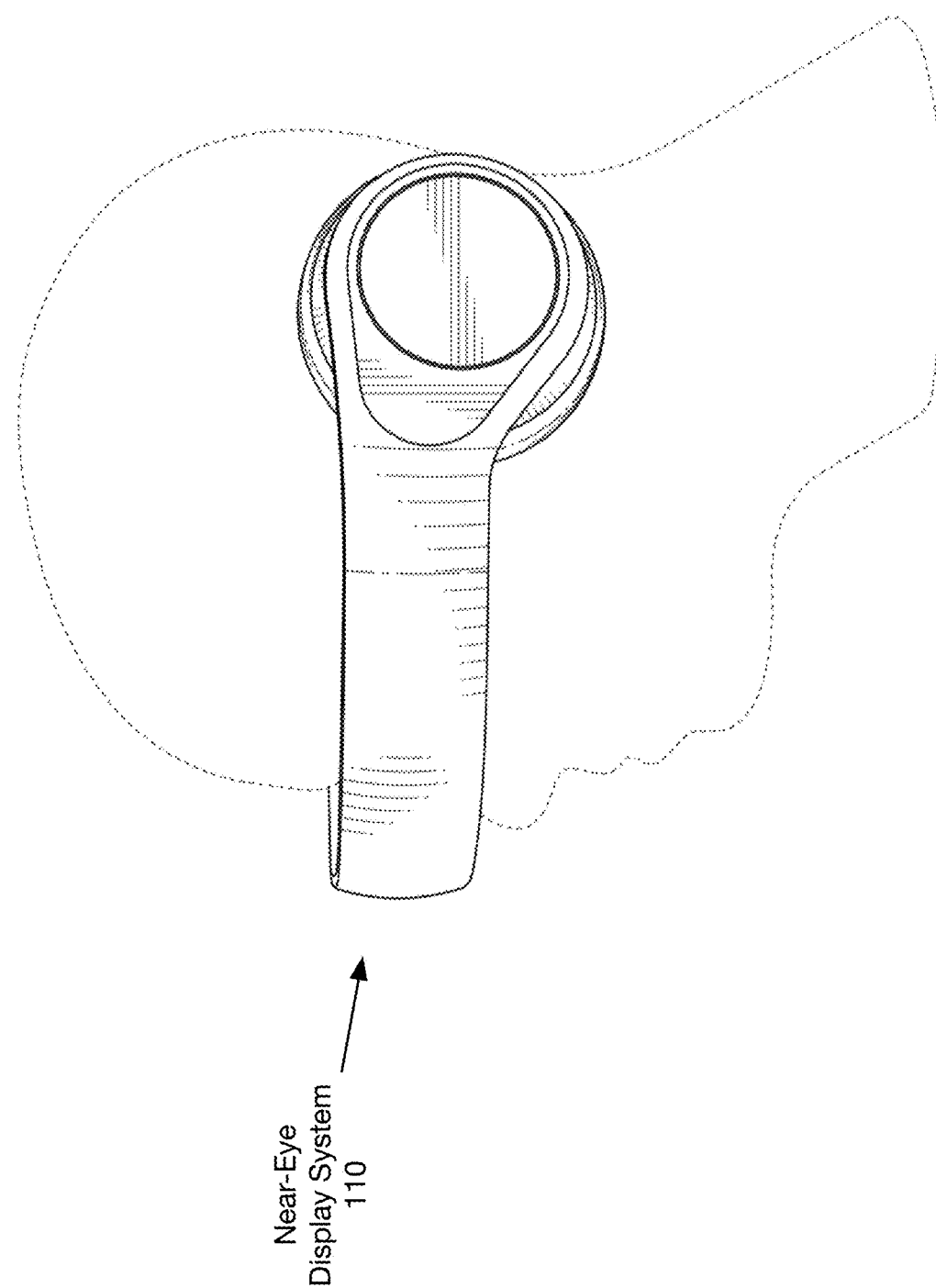
FIG. 1A illustrates an exemplary near eye display system.

FIG. 1A is an illustration of one embodiment of a near-eye display system, in which the present invention may be used. The binocular near-eye display system 110 in one embodiment includes a head-mounted display, which includes a display for both eyes of a user. In one embodiment, the near-eye display system is a display mounted in another device, such as a camera, microscope display, focal assist in a microscope, binoculars, digital scope, medical or surgical display system, endoscope, binocular range finder, etc. In one embodiment, the near-eye display system is coupled with a speaker system to enable the playing of audio-visual output such as movies. The near-eye display system may provide an opaque display, partially transparent display, and/or transparent display. The near-eye display system may provide augmented reality, mixed reality, and/or virtual reality display. The near-eye display system can display image data at a plurality of depths. In one embodiment, the near-eye display system may include two displays for each eye, a high resolution smaller foveal display and a lower resolution large field display. The pixel encoding may be in either, or both, displays.

FIG. 1B illustrates an example of the active display areas of the right and left eyes in a near eye display. For binocular displays, in general, the left eye active display area 120A and right eye active display area 120B are matched to produce stereopsis. FIG. 1C illustrates an example of the frame including the active display area and the front and back porch for the right and left eyes. As can be seen, in addition to the active display area, there are surrounding areas which are not part of the display, which are referred to as the front and back porch. These areas are considered part of the "pixel information" but are not visible to a user.

Figure 1D:
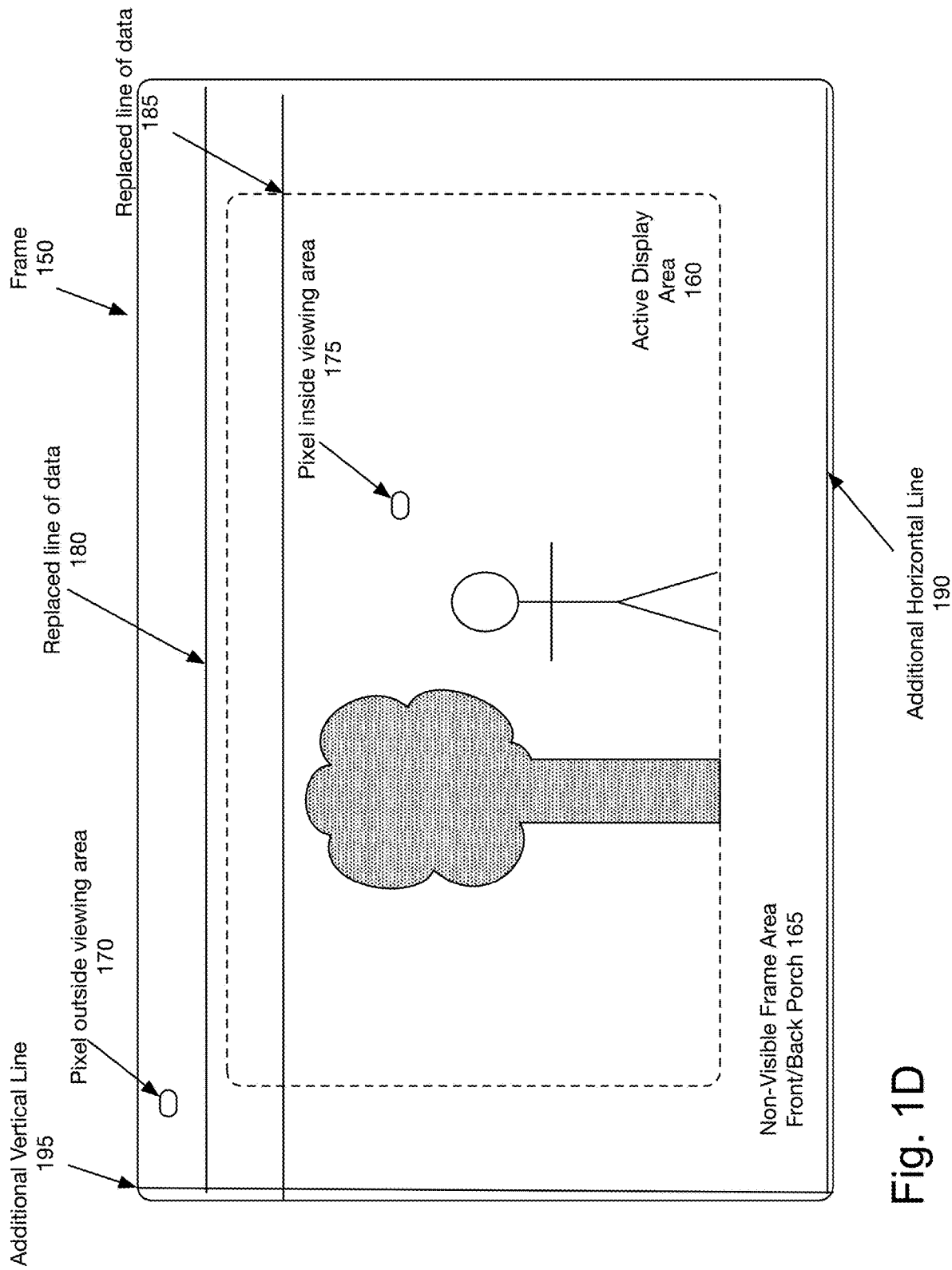
FIG. 1D illustrates a plurality of examples of positioning for the depth data within a frame.

FIG. 1D illustrates a plurality of examples of positioning for the depth data within a frame 150, shown for one eye. The places the depth data may be located and how the data may be included in the pixel information vary. The frame 150 includes the active display area 160, and the non-visible portion of the frame 165, also referred to as the front and back porch, or horizontal and vertical porch.

In one embodiment, the frame 150 may include an additional horizontal line 190, added to the top or bottom of a frame 150. This additional line may be used to encode the depth data, and/or additional data. In one embodiment, this extra horizontal line 190 may be stripped from the frame prior to displaying the frame. In one embodiment, the extra horizontal line 190 may encode depth data, as noted above, as well as other data. The depth data, in one embodiment, may be encoded in a single pixel. The depth data, in one embodiment, may be encoded in a plurality of pixels. In one embodiment, a plurality of depth levels may be encoded in a single pixel, indicating a plurality of depths for various elements within a frame. In one embodiment depth data for a pixel may be encoded in that pixel directly, by utilizing some of the bits normally part of the color depth for position depth data.

In one embodiment, there may be an additional vertical line 195 to encode depth data. In one embodiment, the vertical line 195 may be used in addition to the horizontal line 190. In one embodiment, the combination of the horizontal line 190 and vertical line 195 may be used to encode per pixel depth data for the frame. The encoding may be in the color, a bit depth, and/or a position of the pixel information. In one embodiment, the color may be an adjustment to the color which is undetectable to the user.

In one embodiment, in addition to encoding depth data, the additional line 190 may further encode additional cues. Such cues may include identifying areas to crop in the frame based on image position. The cropping may be useful for a system that overscans and may be used to adjust the frame being displayed, for example based on data from head tracking, providing position correction. Other cues may include user eye focus based adjustments, e.g. image position or rendering resolution variations. In one embodiment, the cue may include color depth/bit depth. In one embodiment, the cue may include an adjustment to the brightness. In one embodiment, the cue data may provide information on which element(s) to distort and/or scale, and how to distort and/or scale those elements. Other cues to adjust the display based on data embedded as pixel information may be used.

However, adding an additional line to a frame of data may cause issues in some displays that are not designed to handle such an additional line. In one embodiment, the system may strip out the additional line 190, 195, after retrieving the encoded depth data, to avoid these issues.

In addition, or in place of the additional line, the system may encode the depth data in other ways. In one embodiment, the depth data is encoded in a replaced line 180, 185. The replaced line 180, 185 replaces the data in a line (or portion of a line). This replaced line 180 may preferentially be positioned outside the active display area 160. The replaced line 180, 185 may alter one or more characteristics of the pixel information in the line, while maintaining the underlying image data. For example, the replaced line 185 may include one or more pixels having shifted colors brightness, patterns, and/or sequences to encode the depth cue information.

In one embodiment, one or more individual pixels may be used to encode the data. There may be a pixel outside the active display area 170, or pixels inside the active display area 175. The pixel replacement may include positioning a particular pixel with a particular characteristic within the visual data, e.g. depth or other cue data may be encoded in the position of the pixel. For example, a black pixel may be used, with the position of the black pixel within the frame providing the encoding for the data.

In one embodiment, the data may be encoded in a relationship between the values of two or more linked elements. The relationship may be a differential between the linked elements. Such linked elements may be two or more lines, areas, and/or pixels in the display. In one embodiment, the linked elements are identical, prior to the differential being applied. For example, the linked elements may be corresponding elements in the left and right eye display. In one embodiment, the differential may be subtle, for example a few degrees difference in color or other aspect of the two pixels that would otherwise be identical. In one embodiment, these shifts are not visually detectable by a user, but can be identified by the system. In one embodiment, groups of pixels may be used to encode depth, such that the change in the values of each pixel are small enough to be visually undetectable by users.

Figure 2:
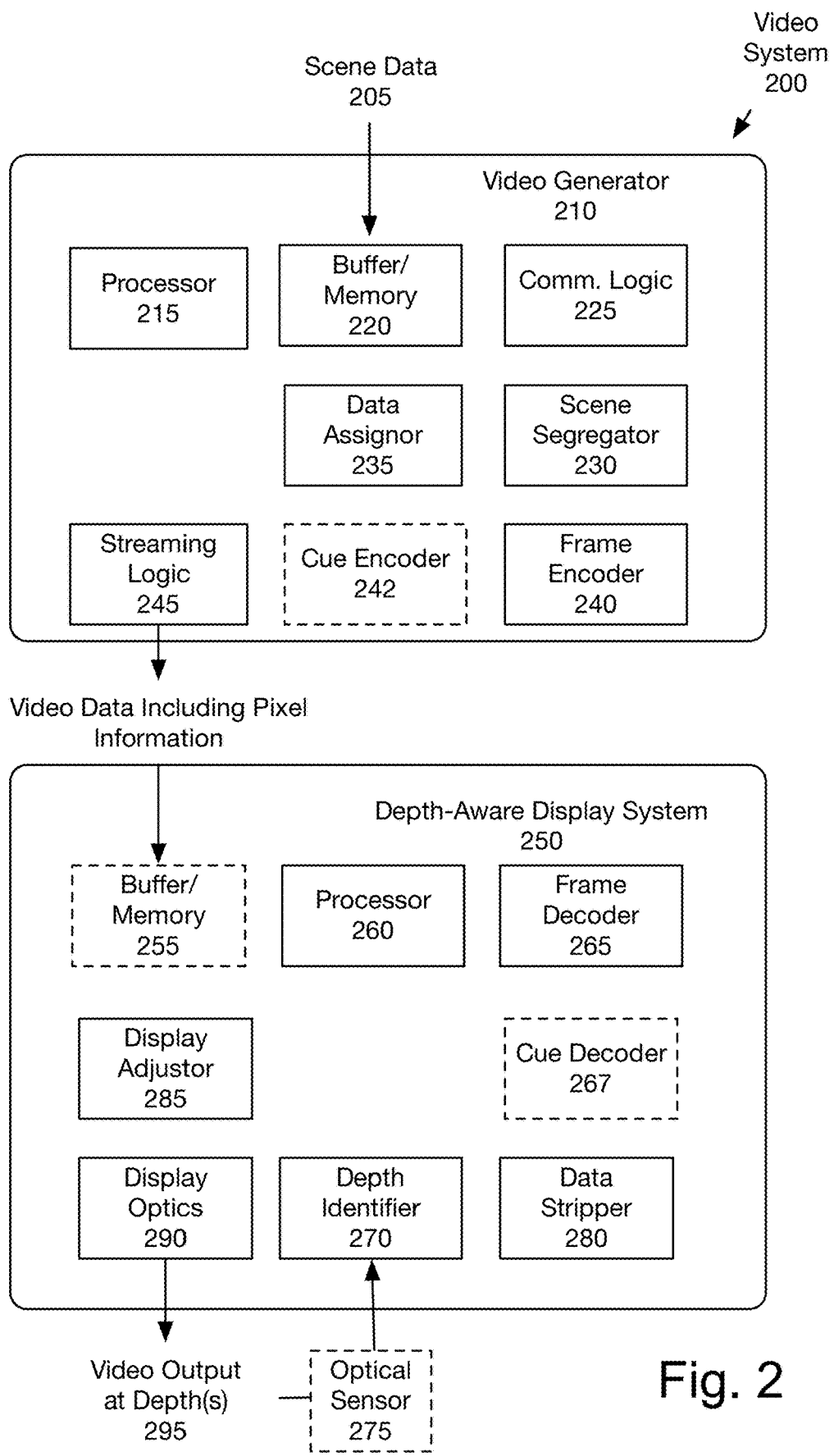
FIG. 2 is a block diagram of one embodiment of a near eye display system including the depth cue systems.

FIG. 2 is a block diagram of one embodiment of a near eye display system including the depth cue systems. In one embodiment, the video system 200 includes a video generator 210 and a depth-aware display system 250. In one embodiment processor 215 implements the processing of video generator 210. In one embodiment, processor 215 may include one or more processing units of various sorts including graphics processing units (CPUs), microprocessors (CPUs), micro-processor units (MPUs), etc.

The video generator 210 is designed to stream video data to the display system 250. In some embodiments, the video generator and display system may be integrated into the same device.

The video generator includes a buffer/memory 220, which receives incoming data. The incoming data may include scene data 205 providing three dimensional data. In one embodiment, the incoming data may be generated by a graphics generator (virtual reality), or may be real-world data (reality), or a combination of generated and real-world data (augmented reality).

Communication logic 225 communicates with the display system 250, to determine the number of depths which may be displayed by the display system 250. In one embodiment, a typical display system may display between one and six different depths. In one embodiment, the image portion at each depth is displayed as a single frame.

Scene segregator 230 assigns each element in the scene data 205 to a frame. The frames are each at different depths, in one embodiment. In one embodiment, the scene segregator 230 may place an item that is at the intersection of two frames partially in both frames. In one embodiment, when the item is placed in both frames, blending techniques are used. The blending techniques may include relative opacity and color/size shifting the pixels based on the frame. For each frame, there is associated depth information, in one embodiment. In some embodiments, one or more frames may also have additional cue data associated with them. The other cue data may indicate areas to crop in the image, image position, image location adjustments due to data from head tracking systems, resolution variation, color bit/depth, brightness reduction, and other data which may be useful for adjusting the display. Some of these adjustments may reduce resolution. In one embodiment, a single frame may include image elements at two or more depths.

The data assignor 235 determines which frame to encode the depth and/or other cue data into. In one embodiment, by default the depth (or other cue) information is encoded into the frame for which the data is applicable. In one embodiment, the data may be encoded into a frame prior to the frame for which the data is applicable. This can be useful when the processing speed on the display is slow.

In one embodiment, in addition to depth data, the system may also embed other cues into the frames. The cue encoder 242 may receive data from other data sources, such as a head tracking system, to determine if there is any cue data to be embedded. If so, the cue encoder 242 identifies the cues to be encoded and passes that data to frame encoder 240, for encoding.

The frame encoder 240 inserts the depth data, and optionally the cue data, into the pixel information in the frame. As noted above, the pixel information may be inserted as one or more lines, areas, or pixels in the frame.

Streaming logic 245 controls the streaming of video data including the frames which encode the pixel information to the depth-aware display system 250.

The depth-aware display system 250 may be a near-eye display, a holographic display or another type of display which can display data including depth information. Processor 260 in one embodiment performs the operations to extract the depth and cue data (if available) and adjust the depth-aware display system 250 based on that data to display the video to the user. In one embodiment, processor 260 may include one or more processing units of various sorts including graphics processing units (CPUs), microprocessors (CPUs), etc.

The video data including pixel information in one embodiment comes to buffer/memory 255. Frame decoder 265 decodes the frame. In one embodiment, the cue decoder 270 identifies any cue data in the pixel information in the frame. The depth identifier 270 obtains the depth data from the pixel information in the frame. In one embodiment, the depth identifier 270 obtains the data directly from the decoded frame data, prior to display. In another embodiment, the depth identifier 270 obtains the depth data from the video output 295, using optical sensor 275. In one embodiment, data obtained from a first frame by the optical sensor 275 may be used to adjust the display depth of some or all of the image elements in the same first frame, if the system is fast enough. In one embodiment, data stripper 285 removes the pixel information which was used to encode this data. In one embodiment, removing the pixel information may include removing the additional line of data, removing the frame encoding the data, and/or adjusting the pixel or line data to restore it to the prior state.

Display adjustor 285 adjusts display optics 290 so that the video data may be presented by the depth-aware display system 250 at the correct depth(s).

In one embodiment, the depth-aware display system 250 may provide a plurality of frames at different depths in sequence in a single visual video frame perceived by the user. This enables the presentation of data at a plurality of depths when the display optics 280 are adjustable to one depth at a time. In one embodiment, the video data presented may be still images. Still images, displayed on a depth-aware display system are presented by showing a repeating sequence of frames. Thus, while the description focuses on video, one of skill in the art would understand that the same techniques may be used in presenting still images on a display 250.

Figure 3:
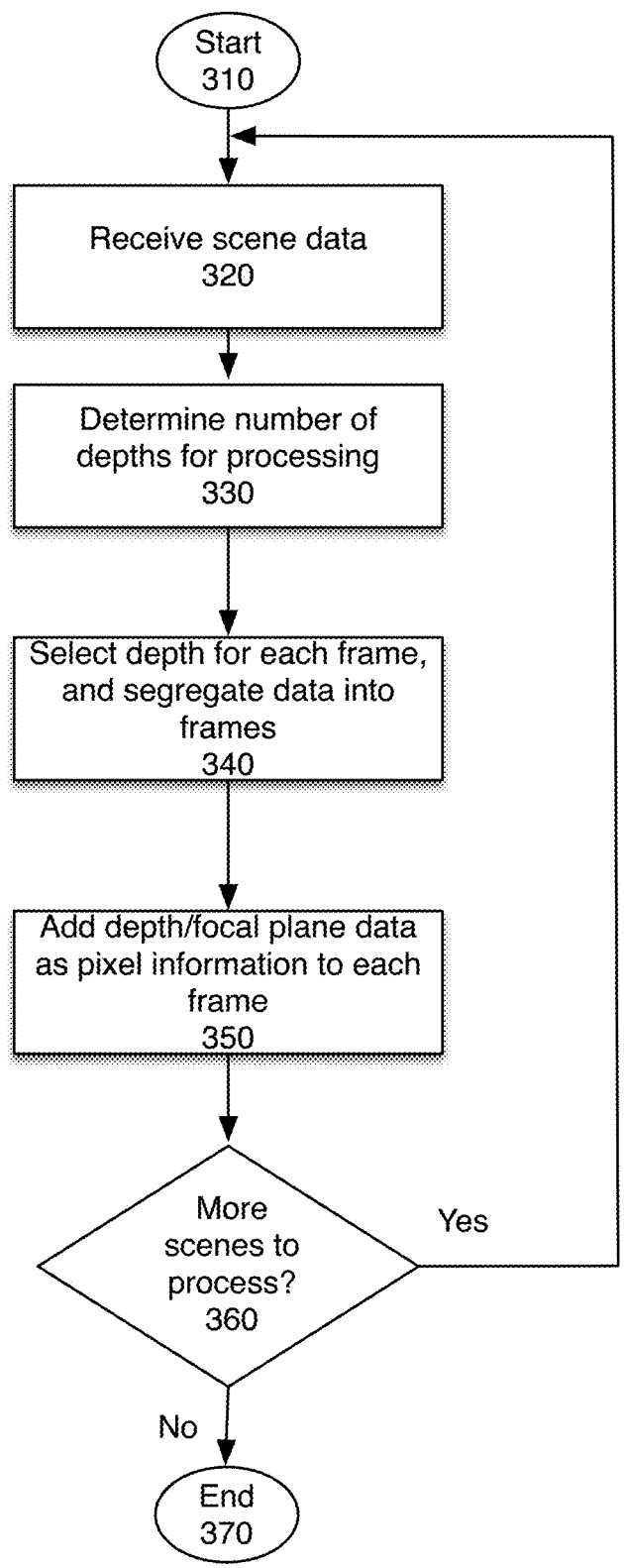
FIG. 3 is a flowchart of one embodiment of inserting the depth data into frames.

FIG. 3 is a flowchart of one embodiment of inserting the depth data into frames. The process starts at block 310. At block 320, scene data is received. A scene is generally a three-dimensional representation of data. The scene data may be obtained from real-world sources or generated. At block 330, the system determines the number of depths for processing. In one embodiment, the system performs a handshake with the display device, to determine the number of depths that the display device can display. In one embodiment, the system generates the number of depths for image elements that are indicated based on the depth capability of the display. In another embodiment, the number of depths may also be limited by the capabilities of the image generation system.

At block 340, a depth is selected for each frame, and the data is segregated into separate frames. In one embodiment, the data is segregated by separating which portions of the data are associated with which depth. In one embodiment, a single image element may be present in multiple frames. In another embodiment, rather than separating into frames, the system may separate the scene into image elements presented concurrently at different depths.

At block 350, the depth/focal plane data is added as pixel information to each frame. In one embodiment, this is done within the visual display but in a non-visible area of the frame, by modifying one or more pixels in the frame, or in some other way. In another embodiment, the data may be encoded in the visible area of the frame, but the encoding may be sufficiently subtle to be undetectable by the user. This processed data is subsequently streamed to a display or stored for later display.

At block 360, the process determines whether there are more scenes to process. If so, the process returns to block 320. Otherwise, the process ends at block 370.

Of course, though this is shown as a flowchart, the ordering of the individual steps may vary. For example, scene data may be received in any order or concurrently. A large number of scenes may be received together and then processed. The individual frames may be processed in parallel, sequentially, or out of order, etc. This is true of the other flowcharts of this application in one embodiment. When flow elements are not dependent on each other, the sequence of the individual process elements may be altered.

Figure 4:
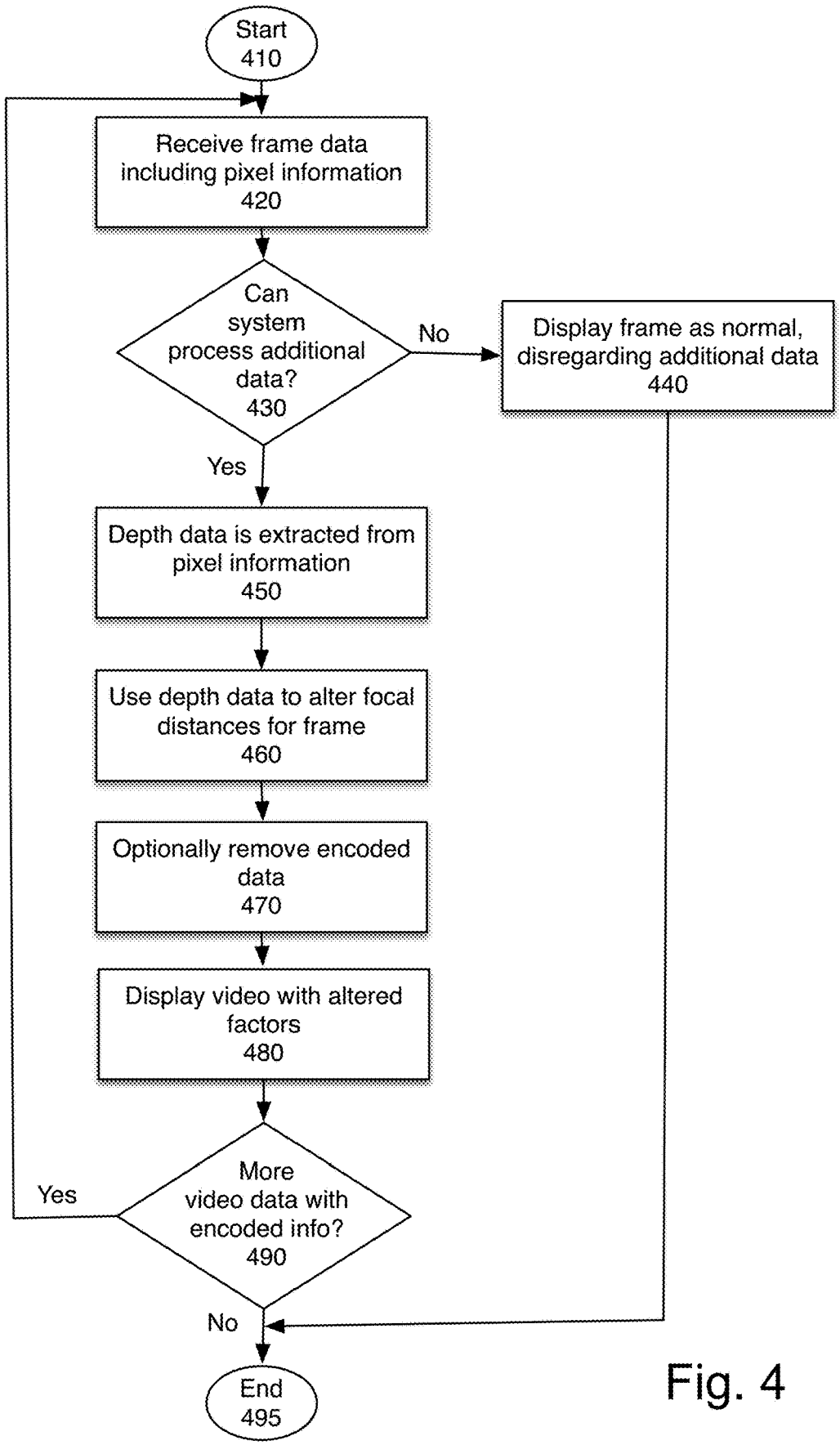
FIG. 4 is a flowchart of one embodiment of using the depth data during display.

FIG. 4 is a flowchart of one embodiment of using the depth data during display. The process starts at block 410. In one embodiment, this process occurs in the near-eye display device.

At block 420, frame data is received, including pixel information encoding depth and/or cue data.

At block 430, the system determines whether it can process the additional data. In some embodiments, the display device may not be able to process the additional data. If the system cannot process the additional data, in one embodiment, the frame is displayed as normal disregarding the additional data, at block 440. In one embodiment, the system may remove the additional data, by dropping a frame in which the additional data is stored, or by removing the additional lines. The process then ends, at block 495.

If the system is capable of processing the additional data, at block 450 the depth data is extracted from the pixel information. As noted above, the depth data may be encoded as altered pixels, additional lines, additional frames, or in some other way.

At block 460 the depth data is used to alter one or more focal distances for the frame, or frame elements. Note that the depth data may apply to a subsequent frame. In one embodiment, if the depth data applies to a subsequent frame, a checksum or other mechanism may be used to ensure that the depth data is applied to the correct frame, in case a frame is dropped, or the ordering is otherwise impacted. The relationship of the pixel information and the frame that it applies to is consistent. Therefore, as the video data streams to the display, the depth data is self-aligned with the visual data, because both are encoded in the video frame.

At block 470, the system optionally removes the encoded data. In one embodiment, if the data is encoded in an easily-removed way, e.g. an additional line or frame, it may be removed by the system prior to display.

At block 480, the video is displayed to the user. The video data has at least one depth associated with it and may have multiple image elements at different depths.

At block 490, the process determines whether there is more video to be displayed that includes the additional pixel information. If so, the process returns to block 420, to process the next frame of data. This process is repeated while video is being sent to the user, and ends when the user stops watching the video, or the video no longer contains pixel encoded depth data, as determined at block 490. At that point, the process ends at block 495.

Figure 5:
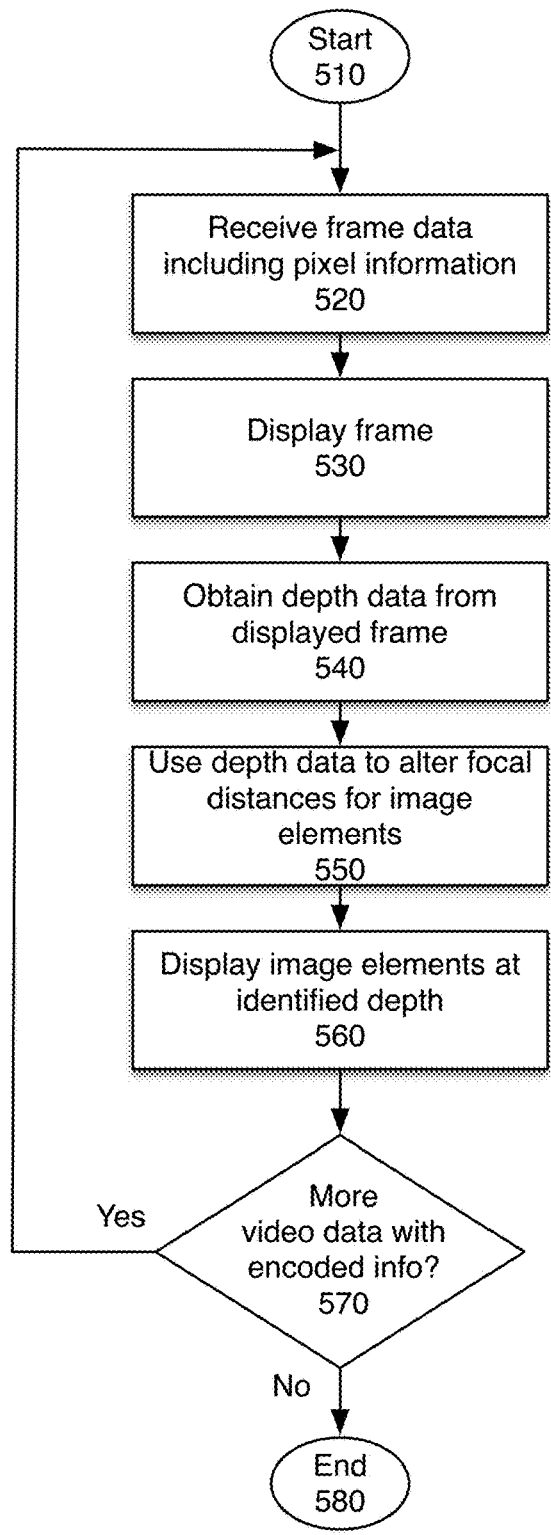
FIG. 5 is a flowchart of one embodiment of using the depth data during display.

FIG. 5 is a flowchart of one embodiment of displaying the data with variable depth, based on detected depth data.

At block 520, frame data including pixel information is received. As noted above, the depth data is encoded in pixel information. The pixel information is a part of the visible display area or the front or back porch, all of which is generated as part of the frame.

At block 530, the system processes the data, and displays the frame.

At block 540, the depth data is obtained from the frame. The depth data may be obtained using a sensor, such as a camera, which obtains data from the displayed frame information. The depth data may be identified using a software process from the frame data rather than the displayed frame.

At block 550 the depth data is used to alter the focal distance for one or more image elements in a frame. These image elements may include the entire frame, a portion of the frame, a subframe, etc.

At block 560, one or more image elements in the frame are displayed at the identified depth. In one embodiment, the system is fast enough that the frame may carry the depth information for its own display. Thus, the frame may initially be displayed at a default depth, and then one of more of the image elements within the frame may be adjusted after the depth data is read, before the user perceives the frame. In another embodiment, the depth data encoded in a frame is the depth for a subsequent frame. Thus, the system adjusts the focal distance for the subsequent frame's image elements.

At block 570, the process determines whether there are more video frames to render. If so, the process returns to block 520, to continue processing the data. Otherwise, the process ends at block 580.

Figure 6:
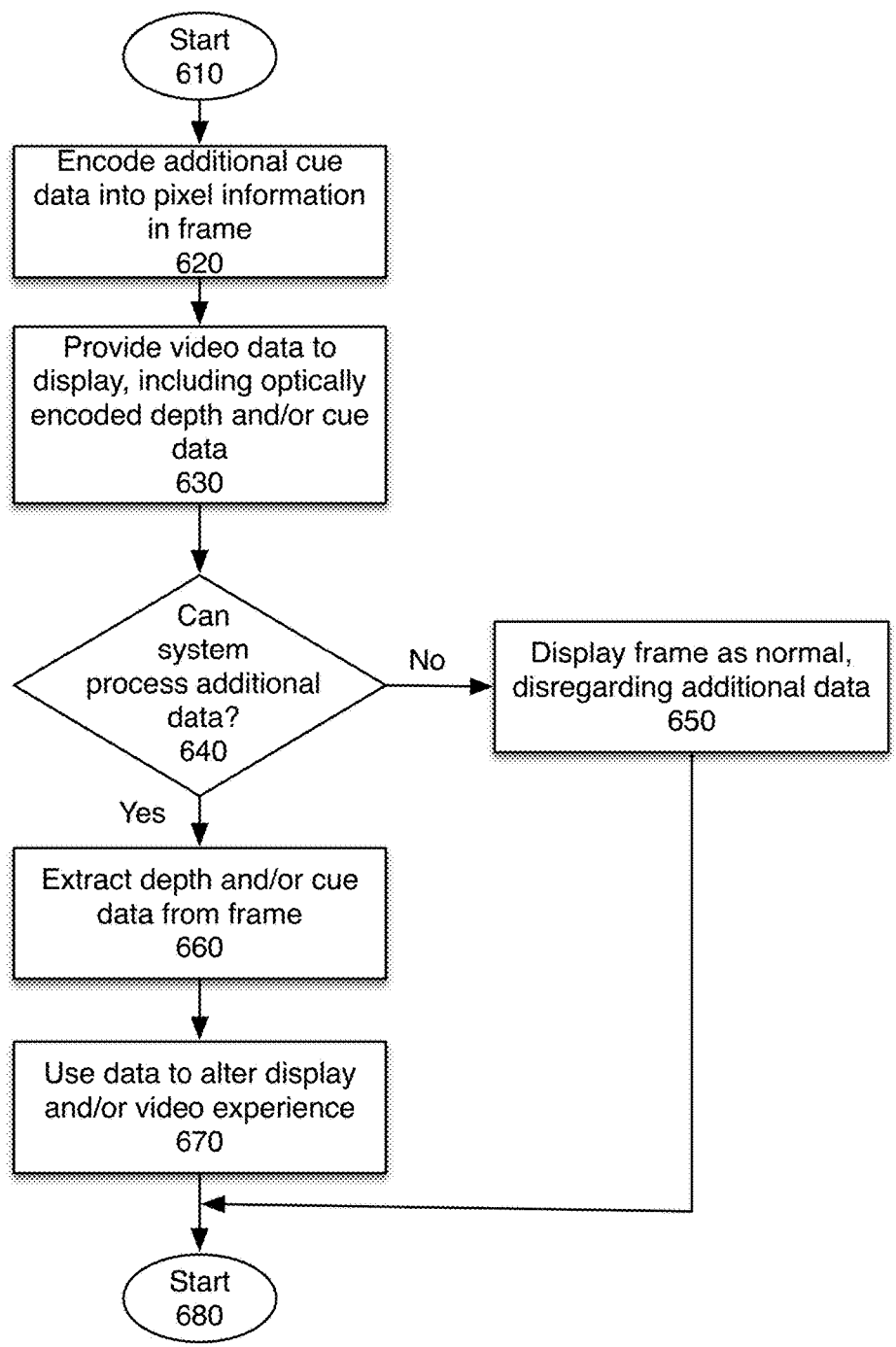
FIG. 6 is a flowchart of one embodiment of using other data extracted from the frame.

FIG. 6 is a flowchart of one embodiment of using other cue data extracted from the frame. These other cues may indicate areas to crop in the image, image position, image location tweaks due to data from head tracking systems, resolution variation, color bit/depth, brightness reduction, and other data which may be useful for adjusting the display in real-time. The process starts at block 610.

At block 620, additional cue data is encoded as pixel information in a frame of video. At block 630, the video data is provided to a display. The video data includes frame data with optically encoded depth and/or cue data.

At block 640, the process determines whether the display device can process this data. If not, at block 650 the frame is displayed as normal, and the additional data is disregarded.

If the system can process the data at block 660 the depth and/or cue data is extracted from the pixel information in the video frame. As noted above, the data may be encoded in additional lines, in pixels, or in a combination, but is encoded within pixel information.

At block 670, the data is used to alter the display and/or video experience. As noted above, these alterations may include changes in resolution, focus, cropping, as well the depth at which image elements or entire frames are displayed.

The process then ends at block 680. As noted above with respect to FIG. 4, this process generally continues until the video display is terminated, or the video stops containing additional data in pixel information.

Figure 7:
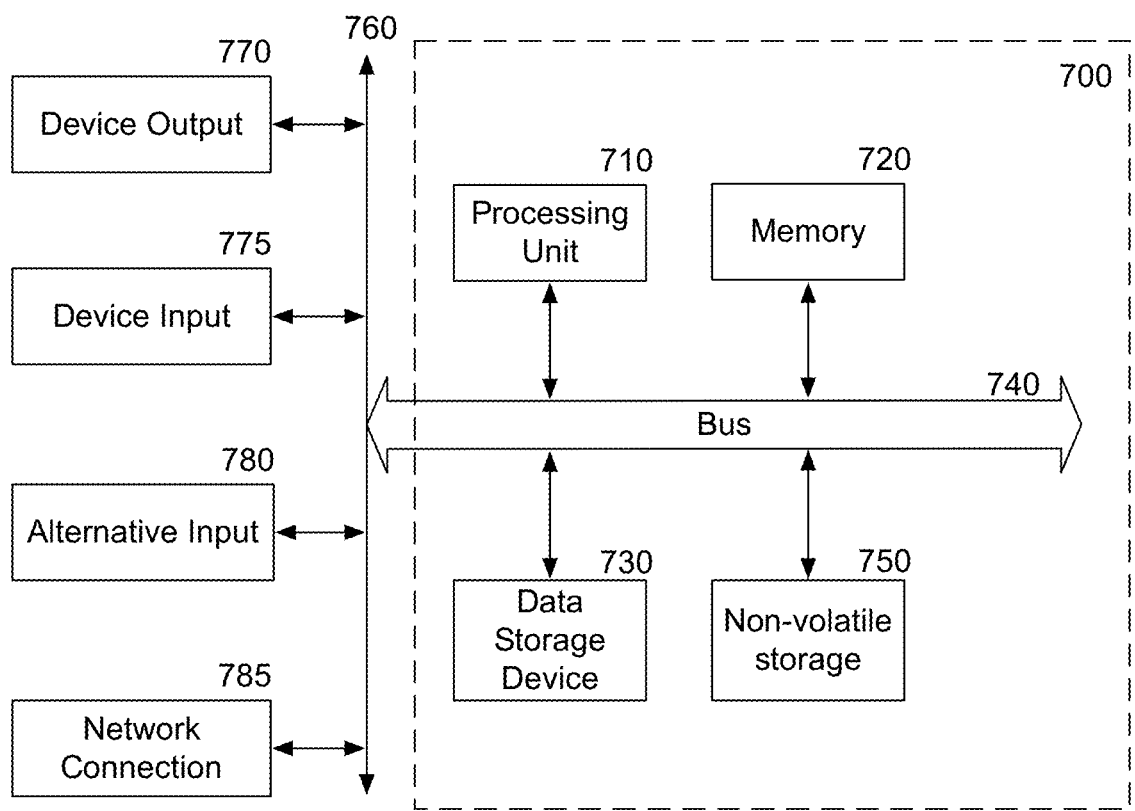
FIG. 7 is a block diagram of one embodiment of a computer system in which the present application may be implemented.

FIG. 7 is a block diagram of one embodiment of a computer system in which the present application may be implemented. It will be apparent to those of ordinary skill in the art, however that other alternative systems of various system architectures may also be used.

The data processing system illustrated in FIG. 7 includes a bus or other internal communication means 740 for communicating information, and a processing unit 710 coupled to the bus 740 for processing information. The processing unit 710 may be a central processing unit (CPU), a digital signal processor (DSP), or another type of processing unit 710.

The system further includes, in one embodiment, a random access memory (RAM) or other volatile storage device 720 (referred to as memory), coupled to bus 740 for storing information and instructions to be executed by processor 710. Main memory 720 may also be used for storing temporary variables or other intermediate information during execution of instructions by processing unit 710.

The system also comprises in one embodiment a read only memory (ROM) 750 and/or static storage device 750 coupled to bus 740 for storing static information and instructions for processor 710. In one embodiment, the system also includes a data storage device 730 such as a magnetic disk or optical disk and its corresponding disk drive, or Flash memory or other storage which is capable of storing data when no power is supplied to the system. Data storage device 730 in one embodiment is coupled to bus 740 for storing information and instructions.

The system may further be coupled to an output device 770, such as a cathode ray tube (CRT) or a liquid crystal display (LCD) coupled to bus 740 through bus 760 for outputting information. The output device 770 may be a visual output device, an audio output device, and/or tactile output device (e.g. vibrations, etc.)

An input device 775 may be coupled to the bus 760. The input device 775 may be an alphanumeric input device, such as a keyboard including alphanumeric and other keys, for enabling a user to communicate information and command selections to processing unit 710. An additional user input device 780 may further be included. One such user input device 780 is cursor control device 780, such as a mouse, a trackball, stylus, cursor direction keys, or touch screen, may be coupled to bus 740 through bus 760 for communicating direction information and command selections to processing unit 710, and for controlling movement on display device 770.

Another device, which may optionally be coupled to computer system 700, is a network device 785 for accessing other nodes of a distributed system via a network. The communication device 785 may include any of a number of commercially available networking peripheral devices such as those used for coupling to an Ethernet, token ring, Internet, or wide area network, personal area network, wireless network or other method of accessing other devices. The communication device 785 may further be a nullmodem connection, or any other mechanism that provides connectivity between the computer system 700 and the outside world.

Note that any or all of the components of this system illustrated in FIG. 7 and associated hardware may be used in various embodiments of the present invention.

It will be appreciated by those of ordinary skill in the art that the particular machine that embodies the present invention may be configured in various ways according to the particular implementation. The control logic or software implementing the present invention can be stored in main memory 720, mass storage device 730, or other storage medium locally or remotely accessible to processor 710.

It will be apparent to those of ordinary skill in the art that the system, method, and process described herein can be implemented as software stored in main memory 720 or read only memory 750 and executed by processor 710. This control logic or software may also be resident on an article of manufacture comprising a computer readable medium having computer readable program code embodied therein and being readable by the mass storage device 730 and for causing the processor 710 to operate in accordance with the methods and teachings herein.

The present invention may also be embodied in a handheld or portable device containing a subset of the computer hardware components described above. For example, the handheld device may be configured to contain only the bus 740, the processor 710, and memory 750 and/or 720.

The handheld device may be configured to include a set of buttons or input signaling components with which a user may select from a set of available options. These could be considered input device #1 775 or input device #2 780. The handheld device may also be configured to include an output device 770 such as a liquid crystal display (LCD) or display element matrix for displaying information to a user of the handheld device. Conventional methods may be used to implement such a handheld device. The implementation of the present invention for such a device would be apparent to one of ordinary skill in the art given the disclosure of the present invention as provided herein.

The present invention may also be embodied in a special purpose appliance including a subset of the computer hardware components described above, such as a kiosk or a vehicle. For example, the appliance may include a processing unit 710, a data storage device 730, a bus 740, and memory 720, and no input/output mechanisms, or only rudimentary communications mechanisms, such as a small touch-screen that permits the user to communicate in a basic manner with the device. In general, the more special-purpose the device is, the fewer of the elements need be present for the device to function. In some devices, communications with the user may be through a touch-based screen, or similar mechanism. In one embodiment, the device may not provide any direct input/output signals but may be configured and accessed through a website or other network-based connection through network device 785.

It will be appreciated by those of ordinary skill in the art that any configuration of the particular machine implemented as the computer system may be used according to the particular implementation. The control logic or software implementing the present invention can be stored on any machine-readable medium locally or remotely accessible to processor 710. A machine-readable medium includes any mechanism for storing information in a form readable by a machine (e.g. a computer). For example, a machine readable medium includes read-only memory (ROM), random access memory (RAM), magnetic disk storage media, optical storage media, flash memory devices, or other storage media which may be used for temporary or permanent data storage. In one embodiment, the control logic may be implemented as transmittable data, such as electrical, optical, acoustical or other forms of propagated signals (e.g. carrier waves, infrared signals, digital signals, etc.).

The above detailed description of embodiments of the invention makes reference to the accompanying drawings in which like references indicate similar elements, showing by way of illustration specific embodiments of practicing the invention. Description of these embodiments is in sufficient detail to enable those skilled in the art to practice the invention. One skilled in the art understands that other embodiments may be utilized and that logical, mechanical, electrical, functional and other changes may be made without departing from the scope of the present invention. The above detailed description is, therefore, not to be taken in a limiting sense, and the scope of the present invention is defined only by the appended claims.

We claim:

1. A method of displaying video data, the method comprising:
    identifying depth information encoded within pixel information of a frame of video data, the depth information encoded outside an active display area of the frame;
    identifying additional cue data encoded within the pixel information of the frame;
    extracting the depth information;
    extracting the cue data;
    utilizing the depth information for displaying the video data to a user at a plurality of focal distances based on the depth information; and
    utilizing the cue data to adjust the video data displayed to the user.

2. The method of claim 1, wherein the depth information is encoded in one or more of a color, a pattern, sequence, a position of the pixel information, and a relationship between linked elements.

3. The method of claim 1, wherein the depth information in the frame includes the depth information for a subsequent frame in the video data.

4. The method of claim 1, further comprising:
    removing the depth information from the frame prior to displaying the video data.

5. The method of claim 4, wherein removing the depth information comprises dropping the frame in which the depth information is encoded.

6. A video system comprising:
    a processor implementing a data assignment system to determine depth data information for a portion of a video frame;
    a cue system to identify additional cue data for encoding in a particular frame;
    a frame encoder to encode the depth information within pixel information of the particular frame, the depth information encoded outside an active display area of the frame;
    the frame encoder further to encode the cue data within the pixel information of the particular frame; and
    a streaming logic to stream the video frame to a display system, the display system to utilize the depth information for displaying the portion of the video frame to a user at a particular focal distance, wherein a single visual video frame is displayed at a plurality of depths.

7. The video system of claim 6, wherein the depth information is encoded in one or more of a color, pattern or sequence, and a position of the pixel information, and a differential between linked elements.

8. The video system of claim 6, wherein the depth information in the particular frame indicates depth information for a subsequent frame.

9. The video system of claim 6, further comprising:
a data stripper in the display system to remove the depth information from the frame prior to displaying the video frame.

10. The video system of claim 9, wherein the data stripper removes the particular frame that encodes the depth information, prior to displaying the video frame.

11. The video system of claim 6, wherein the display system is a near-eye display system.

12. A video system comprising:
a video generator comprising:
a frame encoder to encode depth data in pixel information in a video frame;
a depth-aware display system comprising:
a depth identifier to obtain the depth data from the video frame, wherein the depth data encoded in the video frame is associated with a subsequent frame; and
a display adjustor to modify display optics based on the depth data; and
the display optics to display the video frame to a user, at a plurality of depths determined by the depth data.

13. The video system of claim 12, wherein the depth-aware display system comprises:
a data stripper to remove the pixel information encoding the depth data from the frame prior to displaying the frame to the user.

14. The video system of claim 13, wherein the data stripper removes the video frame in which the depth data is encoded.

15. The video system of claim 12, further comprising:
a cue encoder to encode a cue in the frame, the cue used to control the depth-aware display system output.

16. The video system of claim 12, wherein the depth data is encoded in the pixel information located outside an active display area of the frame.

17. The video system of claim 12, wherein the depth data is encoded in a position of the pixel information.

18. The video system of claim 12, wherein the depth data is encoded in one or more of: a pattern, a sequence, and a relationship between linked elements.

19. A method of displaying video data, the method comprising:
identifying depth information encoded within pixel information of a frame of video data, the depth information encoded outside an active display area of the frame;
extracting the depth information; and
utilizing the depth information for displaying the video data to a user at a plurality of focal distances based on the depth information;
wherein the depth information in the frame includes the depth information for a subsequent frame in the video data.

20. The method of claim 19, wherein the depth information is encoded in one or more of a color, a pattern, sequence, a position of the pixel information, and a relationship between linked elements.

* * * * *